US005726503A

United States Patent [19]

Domanski et al.

[11] Patent Number: 5,726,503

[45] Date of Patent: Mar. 10, 1998

[54] LOW SPEED IDLE ACTUATOR AND METHOD OF USE THEREOF

[75] Inventors: Daniel James Domanski, Muskego; Richard Leo Paulus, Port Washington, both of Wis.

[73] Assignee: Wacker Corporation, Menomonee Falls, Wis.

[21] Appl. No.: 608,851

[22] Filed: Feb. 29, 1996

[51] Int. Cl.$^6$ .......... H02P 9/04

[52] U.S. Cl. .......... 290/40 B; 322/17; 123/339.1; 123/339.13

[58] Field of Search .......... 335/298, 42, 219, 335/220, 249, 258, 262, 263, 270, 271, 273, 278; 290/40 R, 40 A, 40 B, 40 C; 322/17, 28, 37; 123/339.1, 339.13, 339.16

[56] References Cited

U.S. PATENT DOCUMENTS

| | | | |
|---|---|---|---|
| 2,318,359 | 5/1943 | Bellows | 335/273 |
| 2,735,967 | 2/1956 | Lewus | 335/245 |
| 2,748,294 | 5/1956 | Kimberling | 290/40 R |
| 3,082,353 | 3/1963 | Cohen et al. | 361/239 |
| 3,612,892 | 10/1971 | Nobile et al. | 290/40 R |
| 3,626,197 | 12/1971 | Zanzarella et al. | 290/40 C |
| 4,502,436 | 3/1985 | Bonfiglioli et al. | 123/339.13 |
| 4,793,309 | 12/1988 | Huffman et al. | 123/376 |

*Primary Examiner*—Steven L. Stephan
*Assistant Examiner*—Nicholas Ponomarenko
*Attorney, Agent, or Firm*—Nilles & Nilles, S.C.

[57] ABSTRACT

A low speed idle actuator for an internal combustion engine usable, e.g., in an electrical power generator, can be easily and precisely adjusted to set, adjust, or readjust the low speed idle setting of the engine. The actuator includes (1) an electromagnet including a core and a coil which surrounds the core, and (2) an attractor plate which is connected to the governor lever of the engine. Low speed idle adjustment is performed by axially adjusting the position of the core relative to the position of the coil without moving the electromagnet with respect to its mounts or even loosening the electromagnet from its mounts, thereby adjusting the distance through which the attractor plate travels upon electromagnet energization.

19 Claims, 6 Drawing Sheets

LOW SPEED IDLE ACTUATOR AND METHOD OF USE THEREOF

BACKGROUND OF THE INVENTION

1. Field of the Invention

The present invention relates in general to the field of internal combustion engines used in electrical generators or other applications. More particularly, the present invention relates to low speed idle actuators for internal combustion engines. Specifically, a preferred embodiment of the present invention relates to an adjustable core electromagnet mounted on an internal combustion engine as a low speed idle actuator.

2. Discussion of the Related Art

It is desirable in a variety of applications employing relatively small gasoline-powered engines to incorporate low speed idle actuators into or onto the engine. A low speed idle actuator overrides an engine's governor to force the engine to run at reduced speeds upon a reduction in engine load, thereby reducing noise and fuel consumption during periods in which the engine is not subject to loads.

Although many devices powered by relatively small gasoline-powered engines benefit from low speed idle actuators, portable generators are particularly well suited for their use for at least two reasons. First, unlike jack hammers and many other tools powered by gasoline-fueled engines, the engine is the noisiest part of the system and therefore should be as quiet as possible. Indeed, a number of jurisdictions have regulated the use of noise producible by generators and other devices using small engines. By equipping the internal combustion engine of a generator with a low speed idle actuator, the aggregate mount of noise produced during a period of time that includes intervals of low load engine operation can be reduced.

Second, generators are often left unattended for long periods of time, requiring that the engine be as fuel-efficient as possible to maximize the period that the generator may run unattended. Fuel efficiency is of course enhanced by running an engine at relatively low speeds when it is not subject to a load.

In the past, low speed idle actuators were most-often operated either by a solenoid or by an electromagnet coupled to the engine's governor lever. Engine circuitry detected a reduction in load and energized the solenoid or electromagnet to override the governor and/or to close the throttle.

In low speed idle actuators using a solenoid, an internal plunger or armature is connected mechanically to the throttle and/or governor lever of the engine via an adjustable linkage coupled mechanically to the plunger. Energizing the coil of the solenoid causes the plunger or armature to move within the coil, thereby moving the linkage and throttle and/or governor lever. A problem with this configuration has been that the linkages are prone to sticking due to dirt and wear.

In low speed idle actuators using an electromagnet, the entire core is fixed in position with respect to the coil. Upon energization of the electromagnet's coil and consequent magnetization of the core, an attractor plate, located within the electric field generated by the electromagnet and connected to the throttle and/or governor lever of the engine, is drawn towards the core, thereby moving a lever to effect the desired low speed idle control operation. Low speed idle actuators employing electromagnets therefore offer the advantage of not requiring a direct mechanical linkage to the governor lever, and therefore are simpler and more reliable than low speed idle actuators employing solenoids.

It is desirable in low speed idle actuators to vary the possible governor lever arm movement to set the low speed idle setting and/or to accommodate different low speed idle settings. Needless to say, it is desirable for workers who are not intimately familiar with the electromagnet and attractor plate apparatus to be able to adjust/readjust easily and precisely the distance between the internal core and the external attractor plate. However, adjusting the mount of movement that the attractor plate undergoes during coil energization is rather difficult because, rather than adjusting an axially adjustable linkage, the at-rest position of either the core or the actuating plate must be adjusted. Mechanically, the simplest way to set the mount of movement that the attractor plate undergoes during coil energization is to use the tip of the core as a stop for the attractor plate and to vary the location of the core tip. Adjustment of core tip position can be achieved by moving the entire electromagnet with respect to the engine, but such adjustment is difficult to perform with any degree of precision, particularly if the engine is running.

What is needed therefore is a low speed idle actuator, without an internal armature or plunger, that permits the distance between an external attractor plate and a core of the actuator to be adjusted/readjusted easily and precisely so as to cause movement of the attractor plate through a precisely determinable distance.

OBJECTS AND SUMMARY OF THE INVENTION

A primary object of the invention is to provide an apparatus that reduces the idle speed of an engine in response to an external event, such as a reduction in the electrical load imposed on a generator powered by the engine, by a precisely adjustable amount.

Another object of the invention is to provide a low speed idle actuator that is rugged and reliable, thereby decreasing down time and operating expenses.

In accordance with a first aspect of the invention, these objects are achieved by providing a low speed idle actuator comprising an electromagnet and an attractor plate. The electromagnet includes a housing, a magnetic coil disposed within the housing, and an adjustable core which is made of a magnetically conductive material, which is mounted in the housing, and which extends beyond the housing, the adjustable core being movable axially within the housing to reposition the adjustable core with respect to the housing. The attractor plate is made of a magnetically-conductive material, is spaced from the adjustable core by a gap when the coil is deenergized, and, upon energization of the coil, is drawn towards the adjustable core. Movement of the adjustable core with respect to the housing adjusts the thickness of the gap and thus the amount of attractor plate movement occurring upon coil energization.

Preferably, the housing includes a front cover having a threaded hole formed therein. The adjustable core includes a threaded portion which is in threaded engagement with the threaded hole.

In order to prevent unintended core rotation and consequent unintended idle speed adjustment, a clamp is preferably provided which engages the adjustable core and which selectively clamps the adjustable core in place with respect to the housing.

Preferably, a front end of the adjustable core is semi-spherical in shape to facilitate contact with the attractor plate.

In order to facilitate core adjustment, the housing preferably further comprises a rear cover attached to the housing and having a hole formed therethrough. A rear end of the adjustable core extends through the hole in the rear cover and out of the housing and is configured for cooperation with an adjusting tool.

Still another object of the invention is achieved by providing an engine having a low speed idle actuator meeting the first primary object of the invention.

Yet another object of the invention is achieved by providing a generator assembly the engine of which has a low speed idle actuator meeting the first primary object of the invention.

Another object of the invention is to provide a method of adjusting precisely the distance between an attractor plate and the core of an adjustable core electromagnet.

In accordance with yet another aspect of the invention, this object is achieved by first providing an internal combustion engine which includes (1) an engine block assembly including a cylinder, (2) a governor which controls a supply of fuel to the cylinder, (3) a throttle which controls a flow of combustion air to the cylinder, (4) a linkage assembly which is connected to the governor and to the throttle, and (5) a low speed idle actuator assembly. The low speed idle actuator assembly includes an electromagnet including a housing, a magnetic coil disposed within the housing, and an adjustable core which is made of a magnetically-conductive material, which is mounted in the housing, and which extends beyond the housing. The low speed idle actuator assembly further includes a mounting bracket which is attached to the engine block assembly and on which the housing is immovably mounted, and an attractor plate which is attached to the linkage assembly, which is made of a magnetically-conductive material, and which is spaced from the adjustable core by a gap when the coil is deenergized. Subsequent steps include (1) energizing the coil thereby to magnetize the adjustable core and to draw the attractor plate into contact with a tip of the adjustable core, thereby actuating the lever to close the throttle and override the governor to reduce the speed of the engine to a first idle speed, (2) moving the adjustable core axially within the housing to reposition the adjustable core with respect to the housing, and (3) energizing the magnetic coil thereby to magnetize the adjustable core and to draw the attractor plate into contact with the tip of the adjustable core, thereby actuating the lever to close the throttle and to override the governor to reduce the speed of the engine to a second idle speed which is different from the first idle speed.

Moving the adjustable core provides a simple and effective mechanism for adjusting the low idle speed of the engine. Due to the relationship between the core, the housing, and the attractor plate, low idle speed adjustment can be performed even when the coil is energized and the plate is in contact with the adjustable core.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features of the present invention will become more readily apparent by referring to the exemplary embodiments illustrated in the drawings, wherein like reference numerals designate like elements throughout, and in which.

DETAILED DESCRIPTION OF PREFERRED EMBODIMENTS

1. Resume

Pursuant to the invention, a low speed idle actuator for an internal combustion engine usable, e.g., in an electrical power generator, can be easily and precisely adjusted to set, adjust, or readjust the low speed idle setting of the engine. The actuator includes (1) an electromagnet including a core and a coil which surrounds the core, and (2) an attractor plate which is connected to the governor lever of the engine. Low speed idle adjustment is performed by axially adjusting the position of the core relative to the position of the coil without moving the electromagnet with respect to its mounts or even loosening the electromagnet from its mounts, thereby adjusting the distance through which the attractor plate travels upon electromagnet energization.

2. System Overview

Figure 1:
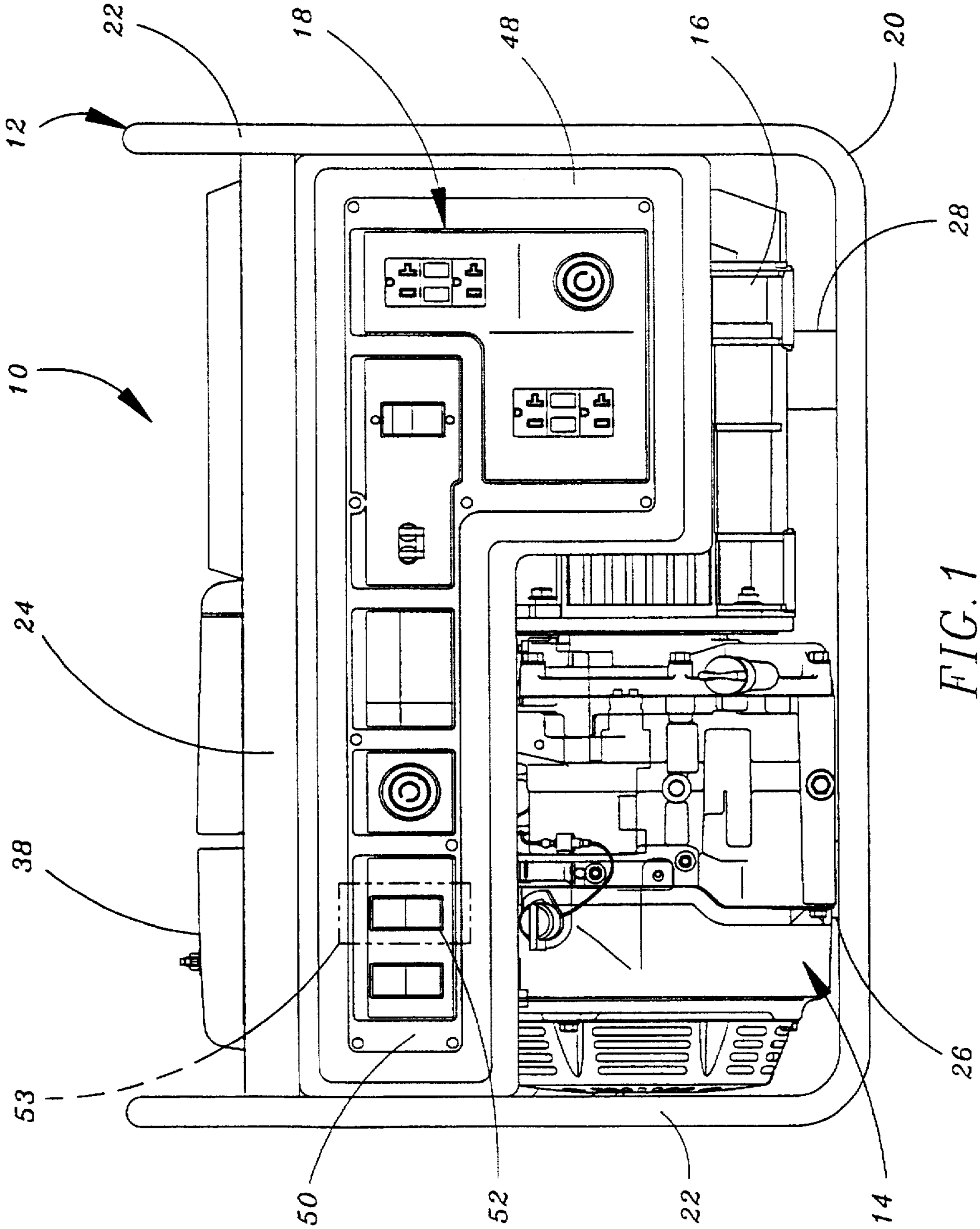
FIG. 1 is a front elevation view of a generator assembly the motor of which employs a low speed idle actuator constructed in accordance with a preferred embodiment of the invention.

Referring initially to FIG. 1, a portable electrical power generator assembly 10 is illustrated which is usable in a variety of industrial, home, construction, and farm applications. The inventive low speed idle actuator is particularly useful in generator assemblies of this type because noise reduction and fuel efficiency are particularly critical with such assemblies. However, the inventive low speed idle actuator is usable with virtually any system having a compatible engine. Generator assembly 10 includes a support frame 12, an engine 14, a generator 16, and a control assembly 18.

The support frame 12, which supports the engine 14 and the generator 16, is compact and lightweight in design to facilitate transport, to provide job site protection for the generator 16 and engine 14, and to minimize storage space requirements. The support frame 12 includes interconnected bottom, side, and top supports 20, 22, and 4, respectively. The engine 14 and generator 16 are mounted on first and second bottom plates 26 and 28 which bridge the bottom tubes 20.

The generator 16 may comprise any conventional AC generator and, in the illustrated embodiment, is an air-cooled generator which can generate either 120 volts or 240 volts of AC power upon demand. It is also possible for the generator 16 to generate both 120 and 240 volts of AC power simultaneously. The generator 16 is, except for certain controls detailed below, well known and, accordingly, will not be detailed.

Figure 2:
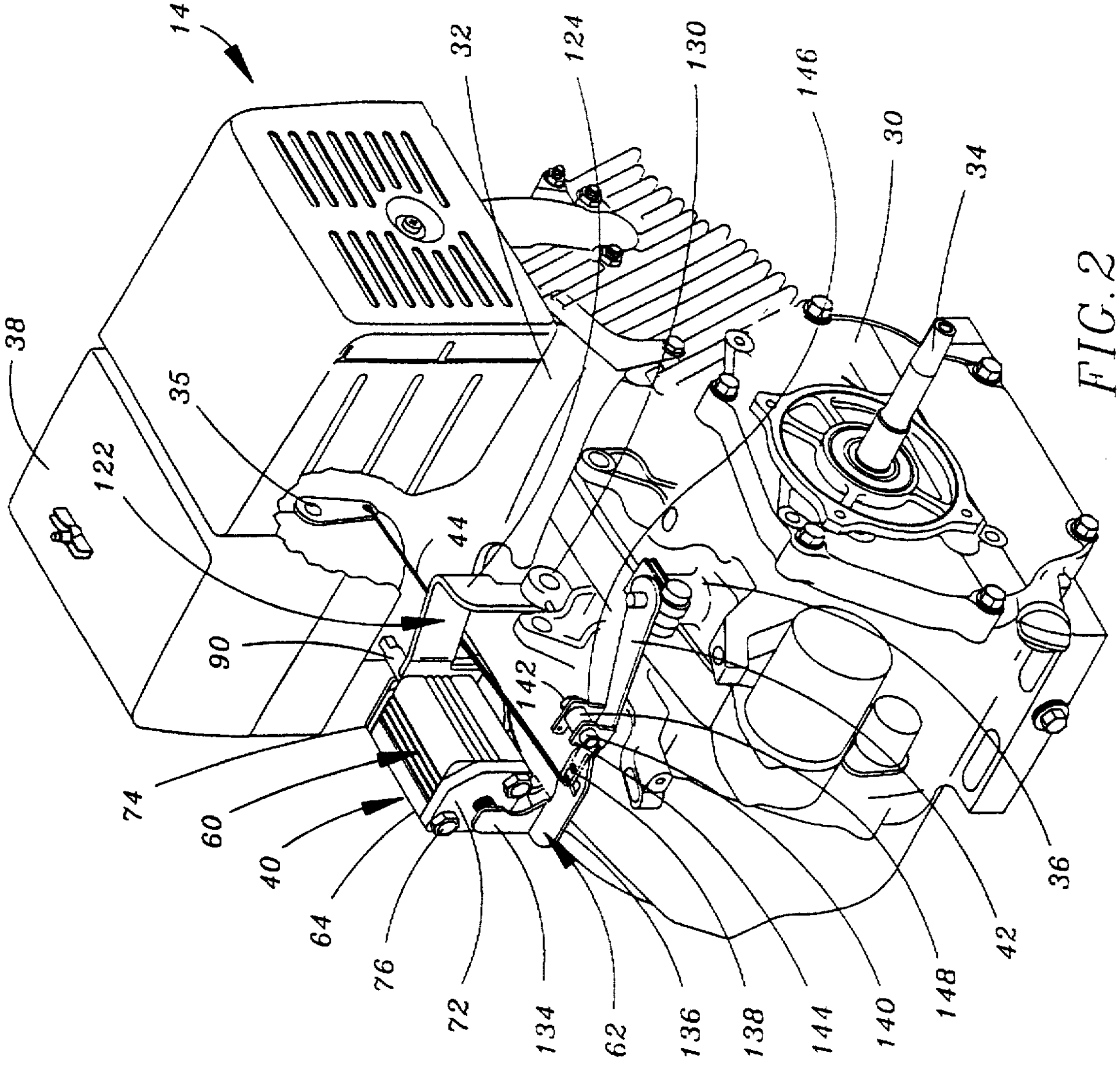
FIG. 2 is a perspective view of the internal combustion engine of the generator assembly of FIG. 1 and of the associated low speed idle actuator.
Figure 3:
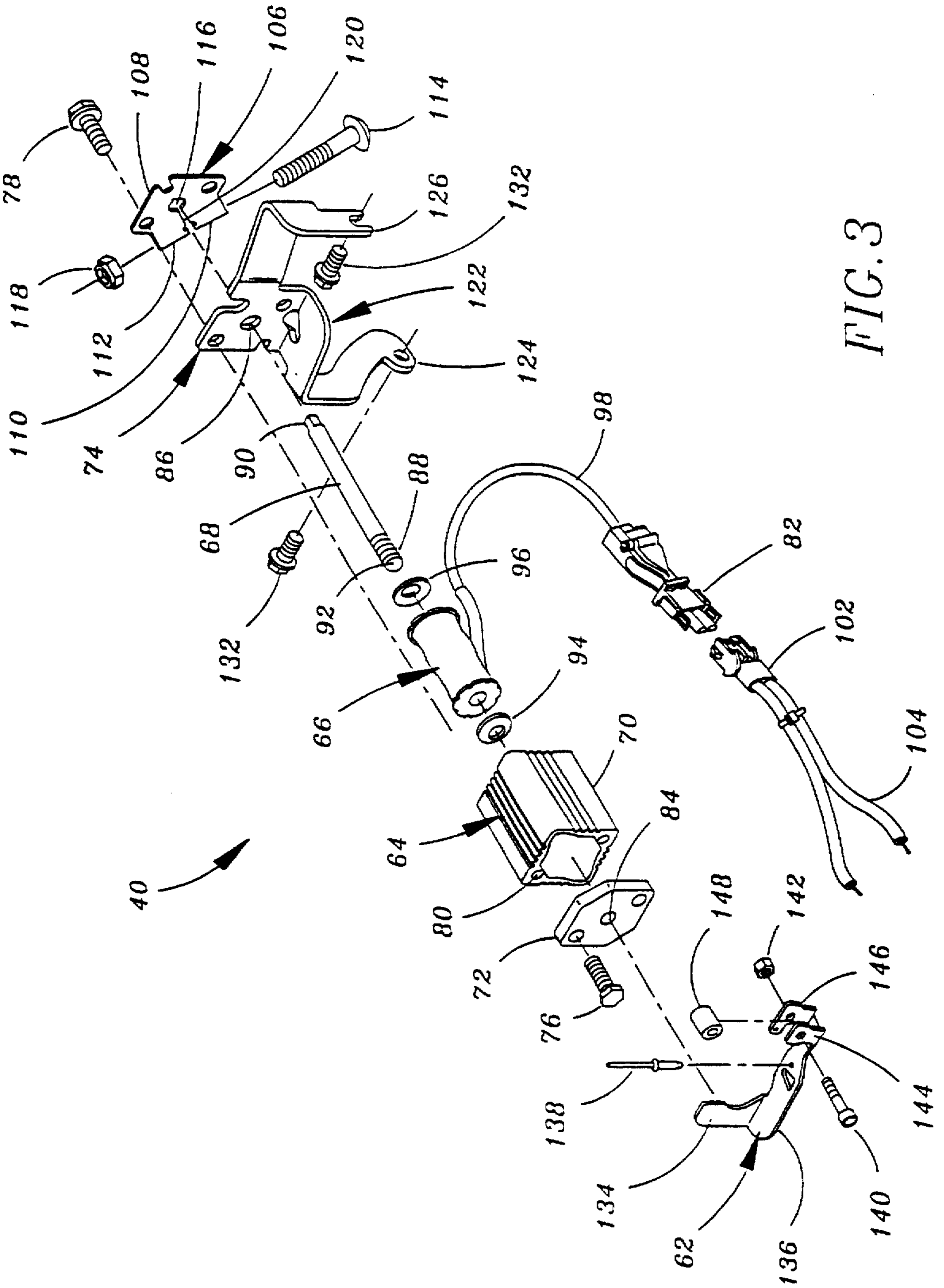
FIG. 3 is an exploded perspective view of the low speed idle actuator of FIG. 2.

The engine 14 may comprise any internal combustion engine having interconnectable governor and throttle controls. Referring to FIG. 2, the illustrated engine 14 is a relatively small (on the order of 1–20 HP) gasoline-powered engine having an engine block 30 which receives a cylinder 32, an output shaft 34, a throttle 35, and a governor 36. Mounted on the engine block 30 are an air cleaner cowling 38 disposed over the throttle 35, and a low speed idle actuator 40. As is conventional, the governor 36 and throttle 35 automatically increase the supply of fuel and air to the engine 14 when loads are imposed on the engine 14. In the illustrated embodiment, the governor 36 and throttle 35 control the maximum speed of the engine 14 to about 3500 rpm when the engine 14 is fully-loaded. Operation of the governor 36 and throttle 35 can be overridden by a linkage assembly including a governor lever 42 and a throttle wire 44. The governor lever 42 has a first end connected to the governor 36 and a second end acted upon by the low speed idle actuator 40 as detailed below. The throttle wire 44 has a first end inserted into an aperture in the governor lever 42 and a second end connected to the throttle 35.

The control assembly 18 (FIG. 1) includes all electronic controls required to run the engine 14, the generator 16, and the low speed idle actuator 40. The control assembly 18 is mounted within a casing 48 which encases the upper portions of the engine 14 and generator 16 and which presents a control panel 50. The control panel 50 receives standard switches and electrical outlets as well as an auto idle control ON/OFF switch 52. Actuation of switch 52 activates an auto-idle control module 53 disposed within the casing 48. The module 53 (1) is coupled electronically to the low speed idle actuator 40 and (2) receives signals from a sensor (not shown) which generates signals indicative of current drawn by the generator and which thus provides an indication of whether or not the engine 14 is loaded. The module 53 causes energizing current to be supplied to low speed idle actuator 40 automatically upon a sensed decrease in engine load. In order to prevent rapid cycling of the engine 14 when loads are repeatedly and rapidly applied to and withdrawn the generator 16, a delay device is built into the module 53 and delays the supply of energizing current to the low speed idle actuator 40 for a designated period of time after a load is removed from the generator 16.

3. Construction of Low Speed Idle Actuator

The low speed idle actuator 40 is designed to pivot the governor lever 42 to override the governor 36 and close the throttle 35 upon receipt of a command signal from the control assembly 18 and to cause the engine 14 to run at reduced speeds. In the preferred embodiment, the low speed idle actuator 40 is activated automatically upon a reduction in engine load, thereby reducing noise and fuel consumptions during periods in which the engine is not subject to loads. The low speed idle actuator 40 is also designed to act without the aid of any direct mechanical link to the governor lever 42 and to permit accurate and precise setting or adjustment of the engine's low idle speed in a simple and effective manner.

Toward's these ends, referring to FIGS. 2–7, the low-speed idle actuator 40 comprises an electromagnet 60 fixedly mounted on the engine 14 and an attractor plate assembly 62 connected to the governor lever 36.

The electromagnet 60 includes a housing 64 in which are disposed an electromagnetic coil 66 and an adjustable core 68. The housing 64 is formed entirely out of non-ferrous materials, preferably aluminum, to avoid interfering with the magnetic field generated by the coil 66. Housing 64 includes a body 70 having from and rear ends capped with front and rear covers 72 and 74 attached to the body 70 by bolts 76 and 78, respectively. Rather than extending through the body 70, the bolts 76, 78 are threaded into mating bores 80 formed in the end of the body 70 to prevent interfering magnetically with the coil 66.

At least one cover of each cover 72, 74 is truncated to define an opening in the housing 64 at the edge of the cover 72, 74 which permits water which leaks into or condenses in the housing 64 to drain from the housing 64. Applicant has found that providing such openings is preferable to sealing the housing 64 because (1) sealing a housing is a rather difficult and expensive process to perform consistently and effectively, and (2) sealing a housing cannot assure that water will not condense in the housing. Providing a cover 72 or 74 with openings at opposite corners thereof is not required from an operational standpoint but facilitates assembly because the assembler need not worry about orienting the cover 72 or 74 any particular way when he or she attaches it to the housing 64.

Figure 4:
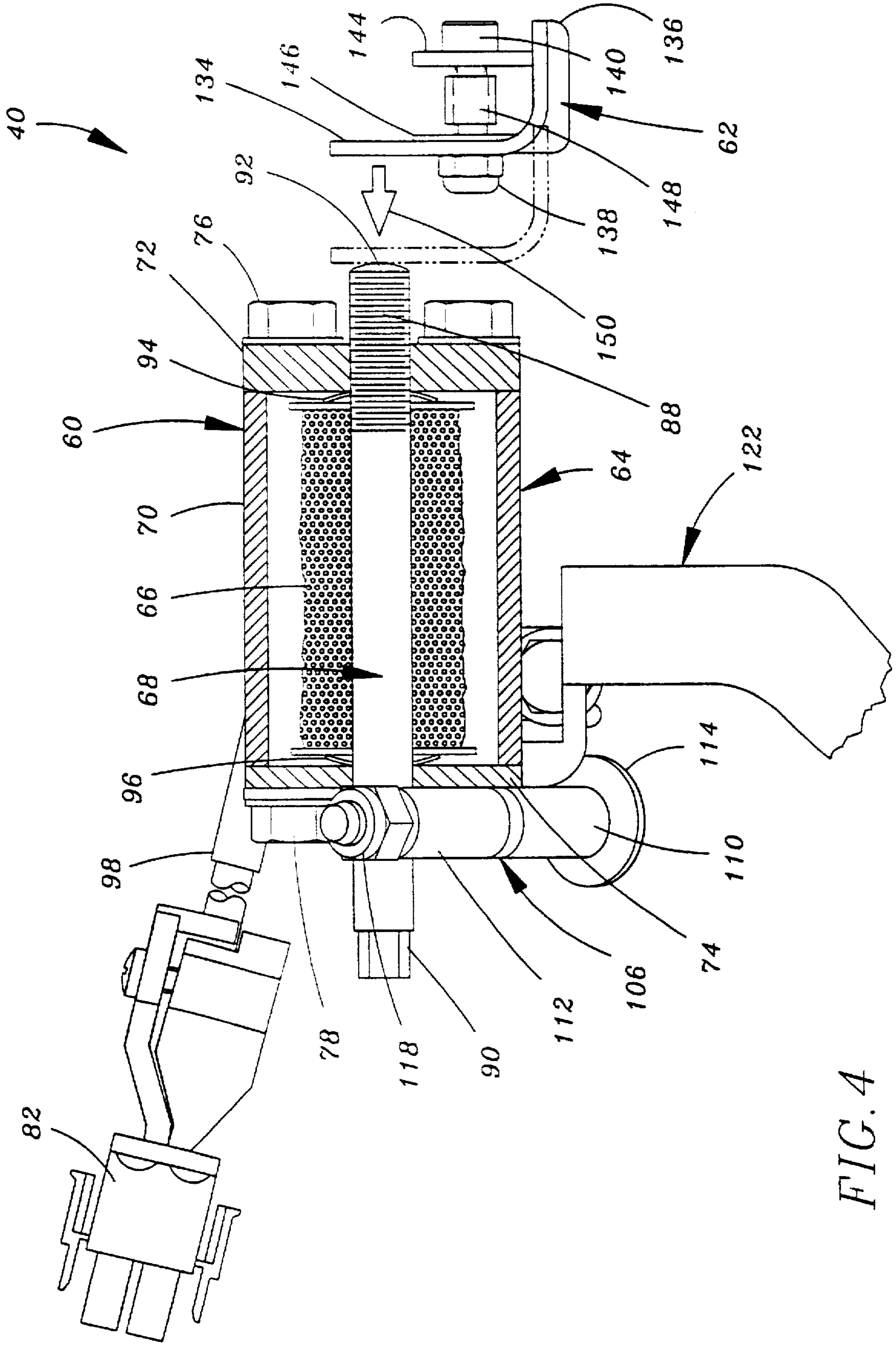
FIG. 4 a side elevation view of the low speed idle actuator of FIGS. 2 and 3.
Figure 5:
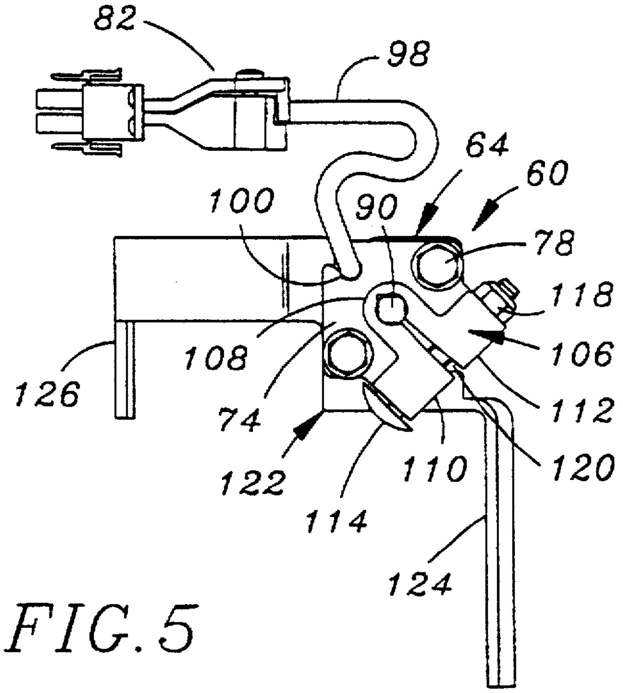
FIG. 5 is a rear end elevation view of the electromagnet of the low speed idle actuator of FIGS. 2–4.
Figure 6:
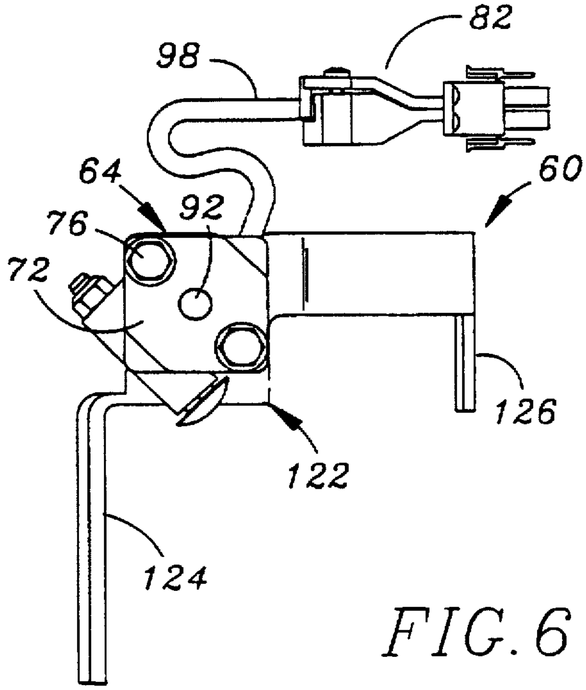
FIG. 6 is a front end elevation view of the electromagnet of FIG. 5.
Figure 7:
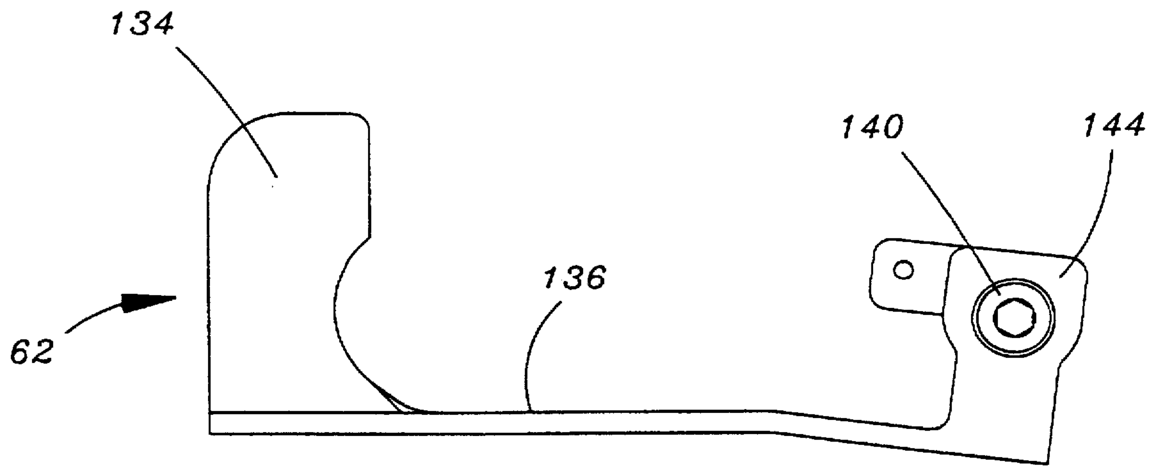
FIG. 7 is a rear end elevation view of the attractor plate assembly of the low speed idle actuator of FIGS. 2–4.

Axially aligned apertures 84 and 86 are formed in the front and rear covers 72 and 74 for receiving the adjustable core 68, which is made from a magnetically conductive material, preferably steel. The core 68 extends through the housing 64 from front to rear to present opposed front and rear ends 88 and 90. The front end 88 of the core 68 is threaded into the aperture 84 in the front cover 72 using ultra-free threads. As best seen in FIG. 4, a front tip 92 of the core 68 is semi-spherical in shape to facilitate contact with the attractor plate 134 as detailed below. The rear end 90 of the core 68 is chamfered to facilitate access by a tool such as a pliers or a wrench.

The electromagnetic coil 66 surrounds the adjustable core 68 and is held from excessive axial movement by front and rear washers 94 and 96 which surround the core 68. A cable 98 is connected to the coil 66 in the conventional manner, extends out a slot 100 (FIG. 5) formed in the edge of the rear cover 74, and is connected to a socket 102 of a wiring harness 104 by a plug 82. The wiring harness 104 is connected electrically to the control assembly 18 and supplies energization current to the cable 98 and coil 66 in a manner detailed below.

A clamp 106 is mounted on the rear cover 74 of the housing 64 to prevent unintended rotation and consequent unintended axial movement of the adjustable core 68 relative to the housing 64. More specifically, the clamp 106 is formed from a plate 108 which is bolted to the housing body 70, preferably by the same bolts 78 connecting the rear cover 74 to the housing body 70. The plate 108 is bent back over itself and enlarged at one side to present (1) axially aligned robes 110 and 112 receiving a bolt 114, and (2) a central aperture 116 for receiving the adjustable core 68. When the bolt 114 is inserted through the tubes 110 and 112 and a nut 118 is tightened onto the bolt 114, the tubes 110 and 112 are drawn axially towards one another (the axial motion being made possible by a slot 120 which is formed in the side of the plate 108 between the tubes 110 and 112) to reduce the diameter of the aperture 116 and clamp the plate 108 to the core 68, thereby effectively preventing rotation of the core 68 relative to the housing 64.

The housing 64 is rigidly and semi-permanently mounted on the engine block 30 by a mounting bracket 122 which is preferably formed integrally with the rear cover 74. The mounting bracket 122 therefore is connected to the housing 64 via the bolts 78. The illustrated mounting bracket 122 has first and second legs 124 and 126 connected to corresponding engine block flanges (only one of which, designated 130, is shown) via bolts 132 threaded into tapped bores in the flanges. However, the shape of the mounting bracket 122 can and would vary to accommodate variations in engine configuration. Moreover, the mounting bracket 122 could be replaced by virtually any structure which fixes the housing 64 to the engine 14.

The attractor plate assembly 62 could comprise virtually any device which is connected to or formed integral with the governor lever 42 and which causes the governor lever 42 and throttle wire 44 to move upon magnetization of adjustable core 68. In the illustrated embodiment, the attractor plate assembly 62 comprises a vertical steel or other ferrous plate 134 provided on a governor lever extension 136. The governor lever extension 136 is mounted on the governor lever 42 by a rivet 138 and by a C-clamp formed from a bolt 140, a nut 142, and upwardly-extending flanges 144 and 146 of the governor lever extension 136. Excessive clamp deflection which could otherwise occur upon tightening the nut 142 onto the bolt 140 is prevented by a spacer 148 which is positioned in the clamp above the governor lever 42.

4. Operation of Generator Assembly and Low Speed Idle Actuator

In operation, the generator assembly 10 generates electrical power by suitable operation of the engine 14 and the generator 16 as is standard with generator assemblies of the illustrated type. Specifically, rotation of the engine's output shaft 34 causes the generator 16 to produce electricity. As long as the generator 16 and thus the engine 14 are loaded by a power demand, fuel and air will be supplied to the engine 14 by the governor 36 and the throttle 35, respectively, at rates required to meet the power demand. During this time, the low speed idle actuator 40 remains inoperative, and the attractor plate 134 maintains the position illustrated in solid lines in FIG. 4.

Assuming now that the power demand on the generator 16 ceases so that the engine 14 ceases to operate under load, the auto-idle control module 53 causes an energizing current to be sent to the electromagnetic coil 66 via wiring harness 104 and cable 98, thereby to magnetize the adjustable core 68. The magnetic field from the adjustable core 68 draws the attractor plate 134 into contact with the front tip 92 of the adjustable core 68 as illustrated by the arrow 150 in FIGS. 4, thereby moving the governor lever 42 and throttle wire 44 to override the governor 36 and close the throttle 35, thus reducing the speed of the engine 14 to a first idle speed determined by the actuated position of the attractor plate 134. Longitudinal movement of the adjustable core 68 is prevented at this time by the clamp 106. The semi-spherical tip 92 of the core 68 assures adequate contact between the attractor plate 134 and the adjustable core 68 when the coil 66 is energized, even if the core 68 and attractor plate 134 are misaligned due to canting of the attractor plate 134 or the housing 64. In addition, the semi-spherical tip 92 of the core 68 assures a uniform air gap between the attractor plate 134 and the adjustable core 68 when the coil 66 is de-energized.

As discussed above, the delay device in the auto-idle control module 53 prevents an energizing current from being supplied to the low speed idle actuator 40 until the engine 14 remains unloaded for a designated time, thereby preventing undesired rapid cycling of the engine 14 if loads are rapidly and repeatedly imposed onto and withdrawn from the generator 16.

When a load is again imposed on the engine 14, the coil 66 is de-energized, thereby to render the adjustable core 68 non-magnetic and to permit the attractor plate 134 to move back to the position illustrated in solid lines in FIG. 4 in which it no longer overrides the governor 36 and closes the throttle 35.

As discussed above, the low idle speed of the engine 14 is determined by the thickness of the gap between the attractor plate 134 and the core tip 92, that is, by the amount of movement of the attractor plate 134 upon coil energization. The low idle speed therefore can be set, adjusted, or readjusted, even when the engine 14 is idling, simply by axially repositioning the adjustable core 68 relative to the housing 64. Specifically, the clamp 106 is loosened and a pliers or wrench used to engage and turn the chamfered rear end 90 of the adjustable core 68, thereby causing the core 68 to rotate about its threads and to move axially with respect to the housing 64. The clamp 106 is then re-tightened to clamp the adjustable core 68 in position. Subsequent coil energization will cause the attractor plate 134 to move a different amount than before, resulting in engine operation at a different idle speed.

The low speed idle actuator 40 having an adjustable magnetic core 68 is rugged and reliable because it lacks linkage assemblies required by solenoid-controlled actuators. The position of the core tip 92 can be positioned precisely and accurately "on the fly," i.e., while the engine 14 is running, and even when the engine is idling, because the housing 64 is firmly fixed in position the entire time so that the only relevant movement of low speed idle actuator components during adjustment is axial movement of the adjustable core 68. The low speed idle actuator 40 is relatively simple to setup and operate and requires only relatively low skilled workers.

Many changes could be made to the invention without departing from the spirit thereof. The scope of these changes will become apparent from the appended claims.

What is claimed is:

1. A low speed idle actuator comprising:

(A) an electromagnet including (1) a housing, (2) a magnetic coil disposed within said housing, and (3) an adjustable core which is made of a magnetically conductive material, which is mounted in said housing, and which extends beyond said housing, said adjustable core being movable axially within said housing to reposition said adjustable core with respect to said housing; and (B) an attractor plate which is made of a magnetically-conductive material, which is spaced from said adjustable core by a gap when said coil is deenergized, and which, upon energization of said coil, is drawn towards said adjustable core, wherein movement of said adjustable core with respect to said housing adjusts the thickness of said gap and thus the amount of attractor plate movement occurring upon coil energization.

2. A low speed idle actuator as defined in claim 1, wherein said housing includes a front cover having a threaded hole formed therein, and wherein said adjustable core includes a threaded portion which is in threaded engagement with said threaded hole.

3. A low speed idle actuator as defined in claim 1, wherein a front end of said adjustable core extends beyond a front end of said housing and is engaged by said attractor plate upon coil energization, wherein a rear end of said adjustable core is located in the vicinity of a rear end of said housing and is accessible by an adjusting tool, and wherein axial movement of said rear end of said adjustable core under the action of said adjusting tool causes said front end of said adjustable core to move axially to adjust the thickness of said gap.

4. A low speed idle actuator comprising:

(A) an electromagnet including (1) a housing, (2) a magnetic coil disposed within said housing, and (3) an adjustable core which is made of a magnetically conductive material, which is mounted in said housing, and which extends beyond said housing, said adjustable core being movable axially within said housing to reposition said adjustable core with respect to said housing;

(B) an attractor plate which is made of a magnetically-conductive material, which is spaced from said adjustable core by a gap when said coil is deenergized, and which, upon energization of said coil, is drawn towards said adjustable core, wherein movement of said adjustable core with respect to said housing adjusts the thickness of said gap and thus the amount of attractor plate movement occurring upon coil energization; and (C) a clamp which engages said adjustable core and which selectively clamps said adjustable core in place with respect to said housing.

5. A low speed idle actuator as defined in claim 4, wherein said clamp includes a locking bolt for exerting a first compressive force against said adjustable core and a locking nut for exerting a second compressive force against said adjustable core.

6. A low speed idle actuator as defined in claim 5, further comprising a mounting bracket for fixedly attaching said electromagnet to an engine.

7. A low speed idle actuator as defined in claim 2, wherein a from end of said adjustable core is semi-spherical in shape to facilitate contact with said attractor plate.

8. A low speed idle actuator as defined in claim 1, wherein said housing further comprises a rear cover attached to said housing, said rear cover having a hole formed therethrough, and wherein a rear end of said adjustable core extends through said hole in said rear cover and out of said housing and is configured for cooperation with an adjusting tool.

9. A low speed idle actuator as defined in claim 8, wherein said rear end of said adjustable core is chamfered.

10. A low speed idle actuator comprising:

(A) an electromagnet including (1) a housing, (2) a magnetic coil disposed within said housing, and (3) an adjustable core which is made of a magnetically conductive material, which is mounted in said housing, and which extends beyond said housing, said adjustable core being movable axially within said housing to reposition said adjustable core with respect to said housing; and (B) an attractor plate which is made of a magnetically-conductive material, which is spaced from said adjustable core by a gap when said coil is deenergized, and which, upon energization of said coil, is drawn towards said adjustable core, wherein movement of said adjustable core with respect to said housing adjusts the thickness of said gap and thus the amount of attractor plate movement occurring upon coil energization, wherein said front cover has an open edge portion which permits water to drain out of said housing.

11. A low speed idle actuator assembly comprising:

(A) an electromagnet including (1) a housing which includes (a) a body having front and rear ends, (b) a front cover attached to said front end of said body by a set of bolts, said front cover (1) having a threaded hole formed therethrough, and (2) having an open edge portion which permits water to drain out of said housing, and (c) a rear cover which is attached to said rear end of said body by a second set of bolts spaced axially from said first set, said rear cover (1) having a hole formed therethrough which is axially aligned with said hole in said front cover, and (2) having an open edge portion which permits water to drain out of said housing;

(2) a magnetic coil disposed within said housing, (3) an adjustable core which is made of a magnetically conductive material, which is mounted in said housing so as to be surrounded by said coil, and which has front and rear ends extending beyond said front and rear covers, respectively, and (4) a clamp which selectively clamps said adjustable core in place with respect to said housing, wherein a front portion of said adjustable core is in threaded engagement with said threaded hole in said front cover thereby to permit said adjustable core to move axially within said housing to reposition said adjustable core with respect to said housing, and wherein, said front end of said adjustable core terminates in a semi-spherical tip said rear end of said adjustable core is chamfered to facilitate access by an adjusting tool, and (5) a mounting bracket which is formed integrally with said rear cover and which is fixable to an engine; and (B) an attractor plate which is made of a magnetically-conductive material, which is spaced from said adjustable core by a gap when said coil is deenergized, and which, upon energization of said coil, is drawn into engagement with said tip of said adjustable core, wherein movement of said adjustable core with respect to said housing adjusts the thickness of said gap.

12. An internal combustion engine comprising:

(A) an engine block assembly including a cylinder;

(B) a governor which controls a supply of fuel to said cylinder;

(C) a throttle which controls a flow of combustion air to said cylinder;

(D) a linkage assembly which is connected to said governor and said throttle and which is selectively movable to close said throttle and override said governor to place said engine in a low speed idle operational state;

(E) a low speed idle actuator assembly including (1) an electromagnet including (a) a housing which includes a body and a front cover attached to said body, (b) a magnetic coil disposed within said housing, and (c) an adjustable core which is made of a magnetically conductive material, which is mounted in said housing, and which extends beyond said front cover, said adjustable core being movable axially within said housing to reposition said adjustable core with respect to said housing;

(F) a mounting bracket which is attached to said engine block assembly and on which said housing is immovably mounted; and (G) an attractor plate which is attached to said linkage assembly, which is made of a magnetically-conductive material, which is spaced from said adjustable core by a gap when said coil is deenergized, and which, upon energization of said coil, is drawn towards said adjustable core, wherein movement of said adjustable core with respect to said housing adjusts the thickness of said gap and thus the amount of attractor plate movement occurring upon coil energization.

13. A generator assembly comprising:

(A) a support frame;

(B) an internal combustion engine which is mounted on said support frame, said engine including (1) an engine block assembly including a cylinder;

(2) an output shaft which is driven to rotate by said cylinder;

(3) a governor which controls a supply of fuel to said cylinder;

(4) a throttle which controls a flow of combustion air to said cylinder;

(5) a linkage assembly which is connected to said governor and said throttle and which is selectively movable to override said governor and to close said throttle to place said engine in a low speed idle operational state;

(6) a low speed idle actuator assembly comprising (a) an electromagnet including (i) a housing which includes a body and a front cover attached to said body, (ii) a magnetic coil disposed within said housing, and (iii) an adjustable core which is made of a magnetically conductive material, which is mounted in said housing, and which extends beyond said front cover, said adjustable core being movable axially within said housing to reposition said adjustable core with respect to said housing;

(7) a mounting bracket which is attached to said engine block assembly and on which said housing is immovably mounted; and (8) an attractor plate which is attached to said linkage assembly, which is made of a magnetically-conductive material, which is spaced from said adjustable core by a gap when said coil is deenergized, and which, upon energization of said coil, is drawn into contact with said adjustable core, wherein movement of said adjustable core with respect to said housing adjusts the thickness of said gap and thus the amount of attractor plate movement occurring upon coil energization;

(C) a generator which is mounted on said support frame, which is coupled to said output shaft, and which generates electricity upon rotation of said output shaft; and (D) a control assembly which is coupled to said generator, and to said engine, said control assembly selectively supplying energizing current to said low speed idle actuator.

14. A generator assembly as defined in claim 13 wherein said control assembly senses whether or not said engine is operating under load, supplies said energizing current to said low speed idle actuator when said engine becomes unloaded, and delays the supply of said energizing current to said low speed idle actuator for a designated period of time after said engine becomes unloaded.

15. A method comprising:

(A) providing an internal combustion engine which includes (1) an engine block assembly including a cylinder, (2) a governor which controls a supply of fuel to said cylinder, (3) a throttle which controls a flow of combustion air to said cylinder, (4) a linkage assembly which is connected to said governor and to said throttle, (5) A low speed idle actuator assembly including (a) an electromagnet including (i) a housing, (ii) a magnetic coil disposed within said housing, and (iii) an adjustable core which is made of a magnetically-conductive material, which is mounted in said housing, and which extends beyond said housing, (6) a mounting bracket which is attached to said engine block assembly and on which said housing is immovably mounted; and (7) an attractor plate which is attached to said linkage assembly, which is made of a magnetically-conductive material, and which is spaced from said adjustable core by a gap when said coil is deenergized;

(B) energizing said coil thereby to magnetize said adjustable core and to draw said attractor plate into contact with a tip of said adjustable core, thereby actuating said lever to close said throttle and override said governor to reduce the speed of said engine to a first idle speed;

(C) moving said adjustable core axially within said housing to reposition said adjustable core with respect to said housing; and (D) energizing said coil thereby to magnetize said adjustable core and to draw said attractor plate into contact with said tip of said adjustable core, thereby actuating said lever to close said throttle and to override said governor to reduce the speed of said engine to a second idle speed which is different from said first idle speed.

16. A method as defined in claim 15, wherein the step of providing said low speed idle actuator assembly comprises providing an actuator assembly in which 1) a front end of said adjustable core extends beyond a front end of said housing and is engaged by said attractor plate upon coil energization and 2) a rear end of said adjustable core is located in the vicinity of a rear end of said housing, and wherein the step of moving said adjustable core axially axial comprises causing said rear end of said adjustable core to move axially by engagement therewith by an adjusting tool, thereby to cause said front end of said adjustable core to move axially to adjust the thickness of said gap.

17. A method as defined in claim 16, wherein said steps of energizing said coil are performed when a load imposed on said engine is removed, and further comprising delaying energization of said coil for a designated period of time after said load is removed.

18. A method comprising:

(A) providing an internal combustion engine which includes (1) an engine block assembly including a cylinder, (2) a governor which controls a supply of fuel to said cylinder, (3) a throttle which controls a flow of combustion air to said cylinder, (4) a linkage assembly which is connected to said governor and to said throttle, (5) A low speed idle actuator assembly including (a) an electromagnet including (i) a housing, (ii) a magnetic coil disposed within said housing, and (iii) an adjustable core which is made of a magnetically-conductive material, which is mounted in said housing, and which extends beyond said housing, (6) a mounting bracket which is attached to said engine block assembly and on which said housing is immovably mounted; and (7) an attractor plate which is attached to said linkage assembly, which is made of a magnetically-conductive material, and which is spaced from said adjustable core by a gap when said coil is deenergized;

(B) energizing said coil thereby to magnetize said adjustable core and to draw said attractor plate into contact with a tip of said adjustable core, thereby actuating said lever to close said throttle and override said governor to reduce the speed of said engine to a first idle speed;

(C) moving said adjustable core axially within said housing to reposition said adjustable core with respect to said housing;

(D) energizing said coil thereby to magnetize said adjustable core and to draw said attractor plate into contact with said tip of said adjustable core, thereby actuating said lever to close said throttle and to override said governor to reduce the speed of said engine to a second idle speed which is different from said first idle speed; and (E) releasing clamping forces on said adjustable core prior to said step of moving said adjustable core and re-applying said clamping forces following said step of moving said adjustable core.

19. A method as defined in claim 16, wherein said step of moving said adjustable core is performed while said coil is energized.

* * * * *